US008435469B2

(12) United States Patent
Hurley

(10) Patent No.: US 8,435,469 B2
(45) Date of Patent: May 7, 2013

(54) AIR POLLUTION SOLUTION TO THE PROBLEM OF OPACITY IN COAL FIRED POWER PLANT STACK EMISSIONS

(75) Inventor: Peter John Hurley, Huddersfield (GB)

(73) Assignee: Cylenchar Limited, West Sussex (GB)

( * ) Notice: Subject to any disclaimer, the term of this patent is extended or adjusted under 35 U.S.C. 154(b) by 0 days.

(21) Appl. No.: 13/167,164

(22) Filed: Jun. 23, 2011

(65) Prior Publication Data
US 2012/0003133 A1  Jan. 5, 2012

Related U.S. Application Data

(60) Provisional application No. 61/360,514, filed on Jul. 1, 2010.

(51) Int. Cl.
*B01D 53/34* (2006.01)
*C09K 3/00* (2006.01)

(52) U.S. Cl.
USPC ............... 423/210; 423/243.01; 252/182.11; 252/182.3

(58) Field of Classification Search ............ 423/243.01, 423/210; 252/182.11, 182.3
See application file for complete search history.

(56) References Cited

U.S. PATENT DOCUMENTS

| | | | | |
|---|---|---|---|---|
| 5,670,122 A | * | 9/1997 | Zamansky et al. | 423/210 |
| 6,942,840 B1 | * | 9/2005 | Broderick | 423/101 |
| 7,666,309 B1 | * | 2/2010 | Baker | 210/696 |
| 7,722,843 B1 | * | 5/2010 | Srinivasachar | 423/210 |
| 7,776,294 B2 | * | 8/2010 | Hurley | 423/210 |

* cited by examiner

*Primary Examiner* — Timothy Vanoy
(74) *Attorney, Agent, or Firm* — Michael J. Brown

(57) ABSTRACT

A method of controlling air pollution arising from sulphur trioxide and or sulphuric acid in coal combustion gases, combustion gases passing through the demister region of a wet flue gas desulphurization unit are exposed to a sulphide based reducing agent such as hydrogen sulphide, such that metal catalysts promoting the oxidation of ammonia leading to the formation of nitrosylsulfuric acid are poisoned and so prevented from catalysing the formation and discharge of sulphuric acid in aerosol emissions in stack gases.

14 Claims, 2 Drawing Sheets

Wet FGD incorporating a Catalyst Poison spray system.

Typical wet FGD detail

Wet FGD incorporating a Catalyst Poison spray system.

AIR POLLUTION SOLUTION TO THE PROBLEM OF OPACITY IN COAL FIRED POWER PLANT STACK EMISSIONS

CROSS REFERENCE TO RELATED APPLICATIONS

This application claims the benefit of U.S. provisional application Ser. No. 61/360,514, filed Jul. 1, 2010, which is incorporated herein by reference.

DESCRIPTION

The Problem of Opacity and the Contribution to it of Sulphur Trioxide

Sulphur trioxide $SO_3$ and its hydrate, sulphuric acid ($H_2SO_4$) are major pollutants emitted in power station combustion gases. Fly-ash and $SO_3$ in the form of its hydrate $H_2SO_4$ are components of flue gas that contribute to the particulate matter (PM) or opacity of a coal fired power plant's stack emissions that are regulated as 'stack opacity'. Whether a particular level of $SO_3$ emissions is considered a problem or not depends on numerous plant-specific factors. Flue gas exit temperature, the configuration and performance of particulate and pollution control equipment, and ambient weather conditions, can all influence the tolerable level of $SO_3$ emissions. $SO_3$ emissions from coal fired power plants are extremely variable and can range from less than 1 ppm to over 30 ppm. Although $SO_3$ emissions are not directly regulated, their contribution to PM may require their control to meet local regulations on stack opacity limits.

Approximately 80% of bituminous coal-fired power plants with selective catalytic reduction (SCR) and/or wet 'flue gas desulphurization' (FGD) systems are likely to produce enough $SO_3$ vapour and mist to make their emissions opaque. Plants fuelled by sub-bituminous coal and lignite do not have the same problem. $SO_3$ related stack opacity problems, sometimes called 'blue plume' can be more prevalent in power plant that have been retrofitted with 'selective catalytic reduction' (SCR) and wet flue gas desulphurisation (FGD) pollution control equipment to meet increasingly lower sulphur dioxide ($SO_2$) and nitrogen oxide ($NO_x$) emissions limits.

It has been estimated that the average stack $SO_3$ concentration for today's bituminous coal-fired capacity equipped with a wet FGD system is approximately 10 ppm. About 65% of these plants would be likely to exceed a 5-ppm stack $SO_3$ concentration (compared with 0% for sub-bituminous and lignite plants). Plants equipped with both a wet FGD system and an SCR system for $NO_x$ control would achieve an additional 1% conversion of $SO_2$ to $SO_3$ by the SCR catalyst in bituminous coal-fired plants. As a result of the higher $SO_3$ production, today's bituminous coal-fired capacity equipped with SCR and wet FGD systems would have an estimated average stack $SO_3$ concentration of over 25 ppm. About 98% of such plants can be expected to have stack $SO_3$ concentrations exceeding 5 ppm. The impact of SCR-related $SO_3$ emissions for sub-bituminous and lignite plants is assumed to be negligible as a result of $SO_3$ adsorption by the alkaline fly-ash. However, bituminous coal still constitutes the major fuel source for the US power utilities.

To date, the most notable instance of blue plume occurred in 2000 at American Electric Power's 2,600-MW General Gavin Plant in Ohio. Following the installation of SCR units there, the plant's $SO_3$ emissions doubled. To mitigate the presence of $SO_3$, power utilities employ Trona (trisodium dihydrogen carbonate dihydrate/$Na_3H(CO_3)_2 \cdot 2H_2O$) spray systems, usually post the wet FGD scrubber. Installation of such systems as a FDG retrofit can be costly and troublesome to operate, as Trona needs to be sprayed as a solid or slurry into the gas post the wet FGD, usually at height.

The Current Industry Hypothesis as to the Source of the Problem

Plants that burn coal with medium to high sulphur content, and that are equipped with wet FGD systems are particularly prone to experiencing sulphuric acid related stack opacity problems. It has been reported that a wet FGD system can only remove 50% of the $H_2SO_4$ entering it, at best. It has also been claimed that in some instances that a wet FGD removes none of the $SO_3/H_2SO_4$ entering it. It is generally believed within the power engineering industry that this occurrence is due to the fact that the gaseous $H_2SO_4$ is condensed to an aerosol mist before the wet FGD system, which the power plant wet FGD cannot remove as readily as it can $SO_2$.

An Alternative Theory

Many analysts have attested to the presence of $H_2SO_4$, recoding it as $SO_3$, post the wet FGD system. Thus, this is a true observation and $H_2SO_4$ is indeed present in micro-aerosolised form the vapours emitted from the stack. However, theories as to its origin of $H_2SO_4$ post the wet FGD system being due to its survival across the FGD spray system are just that, theories. The present invention is based on an alternative theory to the industry accepted convention To a chemist, it seems preposterous that a wet FGD that can remove 95%+ of the $SO_2$ passing through it, yet the same scrubber can't remove all the $H_2SO_4$ in the same gas stream. Sulphur trioxide $SO_3$ and its hydrate $H_2SO_4$ are infinitely soluble in water. For both species, the thermodynamics and kinetics of hydration are massively favoured, as exhibited by their heats of hydration. Also, $H_2SO_4$ is a stronger acid than $H_2SO_3$ and therefore it will react preferentially with carbonates in the wet FGD liquor. Consequently, it is highly implausible that either species, $SO_3$ or $H_2SO_4$, in their gaseous or aerosolised forms could successfully navigate a wet FGD system and remain unchanged. So, if the observed $H_2SO_4$ did not arise owing to it surviving the wet FGD scrubbing process, where and how does it originate? An answer to this can be found in an understanding of the current SCR and wet FGD chemistries and knowledge of the 'Lead Chamber Process, used in past years to manufacture sulphuric acid.

The Impact of SCR on the Flue Gas Chemistry

Reduction of nitrous oxides ($NO_x$) pollution by SCR systems takes place as the gases pass through a catalyst chamber situated in a hot region post the furnace and pre the electrostatic precipitator (ESP). Before entering the catalyst chamber the ammonia, urea, cyanuric acid or ammonium sulphate, is injected and mixed with the gases.

The chemical equation for a stoichiometrically reaction using either anhydrous or aqueous ammonia for a selective catalytic reduction process is:

  (i)

  (ii)

  (iii)

The reaction for urea instead of either anhydrous or aqueous ammonia is:

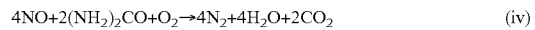  (iv)

However, in the above processes, there are several notable secondary reactions:

  (v)

  (vi)

$$NH_3+SO_3+H_2O \rightarrow NH_4HSO_4 \qquad (vii)$$

$$2NO_2+2NH_3 \rightarrow N_2+NH_4NO_3+H_2O \qquad (viii)$$

As a consequence, the net contribution of the SCR to the combustion flue gas is to reduce NOx to harmless nitrogen but also as an unwanted by-products to introduce; ammonia sulphates and nitrates in the form of, ammonium sulphate ($NH_4HSO_4$), ammonium bisulphate ($(NH_4)_2SO_4$) and ammonium nitrate ($NH_4NO_3$). These salts, being light can pass the ESP. Also, being water soluble and involatile, they ultimately concentrate in the plant water of the wet FGD scrubber liquor.

The Lead Chamber Process

The lead chamber process, in one form or another has been known since the $18^{th}$ century. Sulphur dioxide is introduced along with steam and oxides of nitrogen into large chambers lined with sheet lead where the gases are sprayed down with water and chamber acid. The sulfur dioxide and nitrogen dioxide dissolve, the sulfur dioxide is oxidized to sulfuric acid. Importantly, the presence of nitrogen dioxide is necessary for the reaction to proceed. The process is highly exothermic, and a major consideration of the design of the chambers was to provide a way to dissipate the heat formed in the reactions. These early plants used very large wooden framed rectangular chambers lined with thick sheet lead attached to the frame by lead straps (Faulding box chambers). The process being cooled by ambient air.

Sulfur dioxide for the process was provided by burning elemental sulfur or by the roasting of sulfur containing metal ores in a stream of air in a furnace. During the early period of manufacture, nitrogen oxides were produced by the decomposition of niter (potassium nitrate/$KNO_3$) at high temperature in the presence of acid, but this process was gradually supplanted by the air oxidation of ammonia to nitric oxide in the presence of a catalyst. Why use expensive lead to build the chamber in the first place when a more ceramic glazed engineering brick would have been both accessible and more durable? The answer is simple. In the case of the 'Lead Chamber Process', the catalyst is in fact the 'lead' wall of the chamber itself in the form of its acid corrosion protective $PbO/PbO_2$ scale.

Consider the Chemistry of the Lead Chamber Process:

Sulfur dioxide is generated by burning elemental sulfur or by roasting pyritic ores (iron pyrite or chalcopyrite) in a current of air:

$$S_8+8O_2 \rightarrow 8SO_2 \qquad (ix)$$

$$3FeS_2+8O_2 \rightarrow Fe_3O_4+6SO_2 \qquad (x)$$

$$6CuFeS_2+19O_2 \rightarrow 2Fe_3O_4+6CuO+12SO_2 \qquad (xi)$$

Nitrogen oxides are produced by decomposition of niter ($KNO_3$) in the presence of sulfuric acid or hydrolysis of nitrosylsulfuric acid:

$$2KNO_3+H_2SO_4 \rightarrow K_2SO_4+H_2O+NO+NO_2+O_2 \qquad (xii)$$

$$2NOHSO_4+H_2O \rightarrow 2H_2SO_4+NO+NO_2 \qquad (xiii)$$

In the reaction chambers, sulfur dioxide and nitrogen dioxide dissolve in the reaction liquor. Nitrogen dioxide is hydrated to produce nitrous acid ($HNO_2$) which then oxidizes the sulfur dioxide to sulfuric acid and nitric oxide. The reactions are not well characterized but it is known that the generation of nitrosylsulfuric acid ($NOHSO_4$) is key to the catalysis in the process. The major overall reactions are:

$$2NO_2+H_2O \rightarrow HNO_2+HNO_3 \qquad (xiv)$$

$$SO_2(aq)+HNO_3 \rightarrow NOHSO_4 \qquad (xv)$$

$$NOHSO_4+HNO_2 \rightarrow H_2SO_4+NO_2+NO \qquad (xvi)$$

$$SO_2(aq)+2HNO_2 \rightarrow H_2SO_4+2NO \qquad (xvii)$$

Nitric oxide escapes from the reaction liquor and is subsequently reoxidised by molecular oxygen to nitrogen dioxide. This is the overall rate determining step in the process:

$$2NO+O_2 \rightarrow 2NO_2 \qquad (xviii)$$

Nitrogen oxides are absorbed and regenerated in the process, and thus serve as a catalyst for the overall reaction:

$$2SO_2+2H_2O+O_2 \rightarrow 2H_2SO_4 \qquad (xix)$$

The recovery and reuse of oxides of nitrogen was an important economic consideration in the operation of a chamber process plant. In the reaction chambers, nitric oxide reacts with oxygen to produce nitrogen dioxide. Liquor from the bottom of the chambers is diluted and pumped to the top of the chamber and sprayed downwards in a fine mist, (similar to that present in the demisters at the top of the wet FGD). Sulfur dioxide and nitrogen dioxide are absorbed in the liquid and react to form sulfuric acid and nitric oxide. The liberated nitric oxide is sparingly soluble in water and returns to the gas in the chamber where it reacts with oxygen in the air to reform nitrogen dioxide. Some percentage of the nitrogen oxides are sequestered in the reaction liquor as nitrosylsulfuric acid and as nitric acid, so fresh nitric oxide must be added as the process proceeds.

CONCLUSION

It is evident that within the wet FGD, conditions exist similar to those that generate $H_2SO_4$ in the 'Lead Chamber Process'. Key to the overall formation of $H_2SO_4$ with the scrubber system is generation of nitrosylsulfuric acid ($NOHSO_4$) via the catalytic oxidation of ammonia in the presence of air, heat and acidic hydrated oxides of sulphur. Within the wet FGD we have sulphurous acid at pH 3.5 to 6.5, and temperatures from 200° F. to 360° F. Ammonium sulphates and ammonium nitrate are introduced to the same liquor by the SCR system. All, that is apparently lacking is a metal catalyst. Here we look again at the 'Lead chamber Process'. Why chose lead over other metals? Lead was chosen for 2 reasons; (a) it is the overall catalyst for the process to regenerate the $NOHSO_4$ from ammonia and (b) more importantly it is acid resistant. Other metals, even if not acid resistant can exhibit redox reaction cycles can achieve the same catalytic reduction of ammonia. Industrially Platinum-Rhodium catalysts are used as they are highly efficient and can be infinitely recycled, and are hence the lowest cost option. However, Iron in the form of its $Fe^{III}$ and $Fe^{II}$ oxides would probably be more effective than lead in achieving the required catalysis to regenerate $NOHSO_4$. It is well known that despite the high efficiency of ESP systems, wet FGD systems receive tons per day of fly ash containing a broad cocktail of iron and numerous other heavy metals. Thus, in a real plant situation metals catalysts are abundant within the wet FGD liquor, and possibly also on the oxidised surfaces of the baffles of the demisting unit.

It can be envisaged that the conditions to generate $H_2SO_4$ exist within the scrubber liquor. It is also probable that this $H_2SO_4$ is largely captured in the gypsum-carbonate ($CaSO_4$/$CaCO_3$) wet FGD liquor. However, different conditions arise in the demisting zone above the spray system of the wet FGD. Here we have 'plant water' sprays and no alkali to absorb the $H_2SO_4$. Thus, favourable conditions arise to generate $H_2SO_4$ but not remediate it. In such conditions $H_2SO_4$ can be generated and released up the stack, carried in aerosol from the demisters.

BRIEF DESCRIPTION OF THE DRAWINGS

The invention will become better understood when reference is made to the accompanying drawings, wherein.

SUMMARY OF THE INVENTION

The present invention seeks to prevent the formation of $H_2SO_4$ in demister zone of the scrubber and its consequential discharge from the stack by introducing and 'metal catalyst poison' into the demister spray liquor. The catalyst poison may be introduces by injecting them as a gas or liquid spray into the de-mister zone, to prevent the cyclic formation of $NOHSO_4$.

For the purposes of this patent, a 'catalyst poison' is a substance that reduces the effectiveness of a catalyst in a chemical reaction. In theory, because catalysts are not consumed in chemical reactions, they can be used repeatedly over an indefinite period of time. In practice, however, poisons, which come from the reacting substances or products of the reaction itself, accumulate on the surface of solid catalysts and cause their effectiveness to decrease. For this reason, when the effectiveness of a catalyst has reached a certain low level, steps are taken to remove the poison or replenish the active catalyst component that may have reacted with the poison.

Such catalyst poisons include without limitation; sulphur adducts including hydrogen sulphide and its salts, polysulphide salts (e.g. sodium tetra sulphide, calcium polysulphide), calcium thiosulphate salts, organo-mercaptans, polymeric mercaptans, other proprietary reagents such as CyCurex® of Cylenchar Limited, United Kingdom and or other sulphur based reducing agents, used solely or in combination. These agents act to render the metal components present in plant water, or indeed on exposed metal surfaces within the FGD, demisters and stack, inactive by virtue of them forming surface complexes with those metals. For example lead and iron salts would be rendered into their insoluble sulphides and oxides on exposed metal surfaces would be similarly deactivated. The aforementioned reducing agents may be used in conjunction with dispersions or solutions of alkalis and or bases for example; any alkaline or alkaline earth bicarbonate, carbonate or hydroxide of mixture thereof. Preferably, agents such as; Trona ($Na_3H(CO_3)_2.2H_2O$), magnesium hydroxide ($Ca(OH)_2$) and or calcium hydroxide ($Ca(OH)_2$), used solely or in combination, that will act to neutralise any $H_2SO_4$ or $SO_3$ passing the scrubber and entering the demister zone, that has not been fully sequestered by the catalyst poison.

A key advantage of introducing and expending these reagents at a low dose into the demister zone is that being reducing agents, they have a capacity to interfere with scrubber oxidation chemistry where calcium sulphite is converted to calcium sulphate. Direct addition to the scrubber of certain of these agents direct to the scrubber liquor could cause a catastrophic collapse of the gypsum process are render the wet FDG incapable of doing its primary function, of capturing and neutralizing $SO_2$.

EXAMPLE

Figure 1:
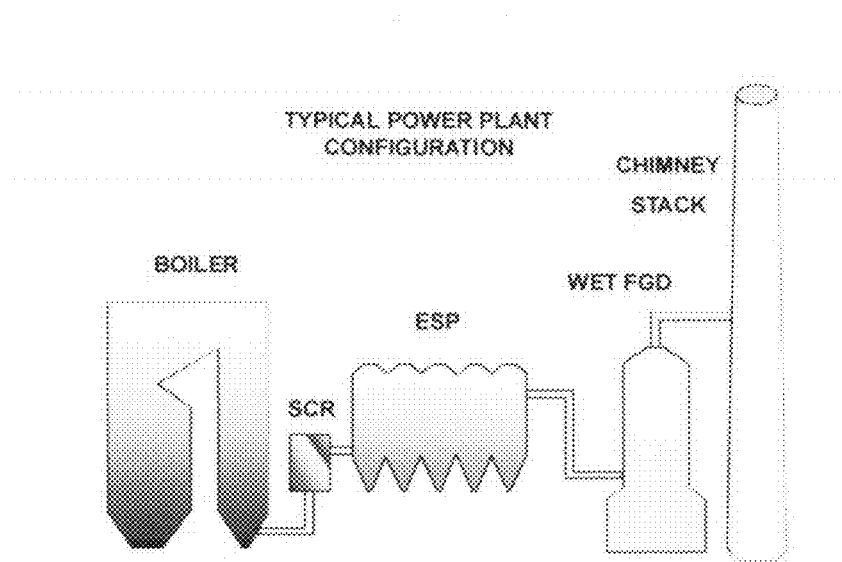
FIG. 1 is a schematic illustration of a typical coal fired power plant configuration, incorporating SCR and wet FGD systems.
Figure 2:
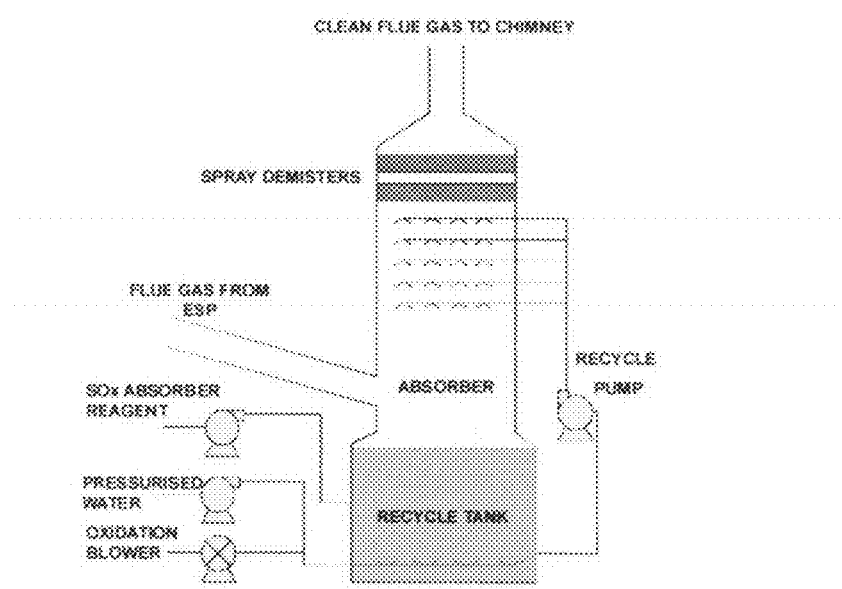
FIG. 2 is a schematic illustration of a wet FGD scrubber system for removing sulfur dioxide of a typical coal fired power plant configuration.
Figure 3:
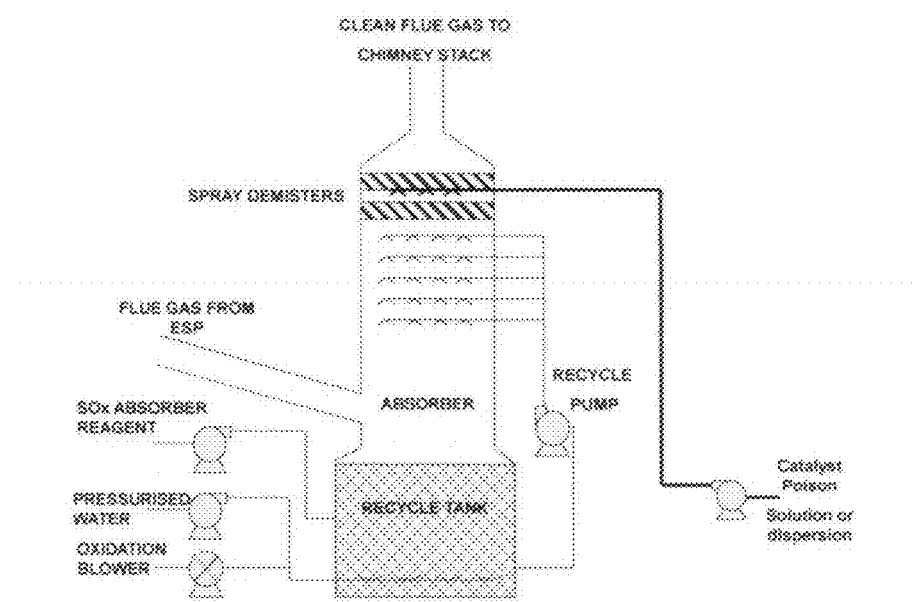
FIG. 3 is a schematic illustration of a wet FGD scrubber system for removing sulfur dioxide from a combustion gas according to one embodiment of the present invention.

Coal fired power plant combustion exhaust gases may contain 15-35 ppm $SO_3$, as measured by gas opacity at the stack. Treatment of the exhaust gases by spraying with 3-5 stoichiometric equivalents of a basic or alkaline dispersion such a magnesium hydroxide ($Mg(OH)_2$) or 'Trona' ($Na_3H(CO_3)_2.2H_2O$) into the demister region of a wet FGD scrubber, as illustrated FIG. 3, can reduce $SO_3$ as measured by opacity by 40-60%. Whereas treatment of the same gases on a like for like basis with 3-5 mole of CyCurex® A25, a proprietary blend of calcium polysulfide of Cylenchar Limited of the United Kingdom, used solely or in combination with a solution of alkaline or basic components can reduce the opacity by 70-90%. To facilitate the dispersion efficiency of alkaline earth bases the composition may further comprises a surfactant or hyperdispersant, with a polyethylene oxide-polyethylene block co-polymer and the phosphate esters thereof being preferred dispersing agents.

What is claimed is:

1. A composition for reducing the opacity of exhaust gasses of a wet flue gas desulfurization scrubber comprising an aqueous solution or dispersion of at least one catalyst poison applied in conjunction with an alkali or basic component.

2. The composition of claim 1, wherein the catalyst poison may be an alkaline or alkaline-earth polysulfide or blend thereof.

3. The composition of claim 2, wherein the composition is a mixture that contains calcium polysulfide and/or magnesium polysulfide.

4. The composition of claim 2, wherein the alkali of base may be an alkaline or alkaline earth bicarbonate, carbonate or hydroxide or a mixture thereof.

5. The composition of claim 2, wherein the composition further comprises a surfactant or hyperdispersant.

6. The composition according to claim 5, wherein the surfactant or hyperdispersant is a polyethylene oxide-polyethylene block co-polymer and the phosphate esters thereof.

7. The composition of claim 1, wherein the alkali or basic component is calcium carbonate.

8. A method for reducing the opacity of exhaust gasses by introducing a composition comprising an aqueous solution or dispersion of at least one catalyst poison, into the demister region of a wet FGD.

9. The method of claim 8, wherein the catalyst poison is applied in conjunction with an alkali or basic component.

10. The method of claim 8 or 9, wherein the catalyst poison may be an alkaline or alkaline-earth polysulfide or blend thereof.

11. The method of claim 8 or 9, wherein the composition is a mixture that contains calcium polysulfide and/or magnesium polysulfide.

12. The method of claim 10, wherein the alkali or basic component may be an alkaline or alkaline earth bicarbonate, carbonate or hydroxide or a mixture thereof.

13. The method of claim 10, wherein the composition further comprises a surfactant or hyperdispersant.

14. The method according to claim 13, wherein the surfactant or hyperdispersant is a polyethylene oxide-polyethylene block co-polymer and the phosphate esters thereof.

* * * * *